United States Patent [19]

Fraser et al.

[11] 4,149,792
[45] Apr. 17, 1979

[54] MISFOCUS PREVENTION MEANS FOR CAMERAS HAVING UNIDIRECTIONAL AUTOMATIC FOCUSING

[75] Inventors: Richard J. Fraser, Franklin; John C. Ostrowski, Maynard, both of Mass.

[73] Assignee: Polaroid Corporation, Cambridge, Mass.

[21] Appl. No.: 865,854

[22] Filed: Dec. 30, 1977

[51] Int. Cl.² .............................................. G03B 3/00
[52] U.S. Cl. ..................................... 354/195; 354/25; 352/140
[58] Field of Search ............................ 354/5, 25, 195; 352/140

[56] References Cited

U.S. PATENT DOCUMENTS

| | | |
|---|---|---|
| 3,435,744 | 4/1969 | Stimson ............................... 354/25 |
| 3,442,193 | 5/1969 | Pagel .................................. 354/25 |
| 3,443,502 | 5/1969 | Harvey ............................... 354/25 |
| 3,522,764 | 8/1970 | Biber ................................. 354/195 |
| 3,618,499 | 11/1971 | Harvey ............................... 354/25 |
| 3,713,371 | 1/1973 | Kurihara et al. .................... 354/25 |
| 4,040,065 | 8/1977 | Booth ................................. 354/5 |
| 4,080,531 | 3/1978 | Stauffer .............................. 354/25 |

*Primary Examiner*—Russell E. Adams
*Attorney, Agent, or Firm*—John J. Kelleher

[57] ABSTRACT

A variable focus lens capable of being moved within and outside of its normal focusing range by a manual and an automatic focus control system is provided with spring force biasing means to urge said lens into its normal focusing range to avoid the possibility of said lens being misfocused by said automatic focus control system.

16 Claims, 6 Drawing Figures

MISFOCUS PREVENTION MEANS FOR CAMERAS HAVING UNIDIRECTIONAL AUTOMATIC FOCUSING

BACKGROUND OF THE INVENTION

1. Field of the Invention

The present invention relates to variable focus lens systems having both automatic and manual focusing means in general, and to such lens systems for photoalgraphic cameras, in particular.

2. Description of the Prior Art

Variable focus lenses and apparatus utilizing such lenses, such as photographic cameras, telescopes and the like are well known and their operation are well understood in the prior art. A camera having a variable focus lens and having a focus control system coupled to said lens for automatically focusing image-containing light rays of a remote object at the film plane of said camera in response to a rangefinder derived signal representative of the actual distance between said camera and said remote object, are known in the prior art. A camera having such a focus control system that utilizes acoustical energy to determine the distance to an object remote from said camera is described in U.S. Pat. No. 3,522,764 to BIBER et al. One arrangement that combines automatic focusing as in said BIBER et al patent with a conventional optical type couple rangefinder in a single photographic camera is described in U.S. Patent application Ser. No. 838,581 by OSTROWSKI et al.

A bidirectional focus control system, i.e., a focus control system that, once commanded to do so, can move the movable element of a variable focus lens in either of two directions from any initial position within the normal focusing range of said lens, for focusing purposes, is also known in the prior art. One example of such a system is described in the above-mentioned BIBER et al. patent.

Another type of focus control system for a variable focus lens is sometimes referred to as a unidirectional focus control system in that the movable or focusing element of such a lens is always moved from the same or known reference point for focusing purposes. While such an element is movable in either of two axial directions, no lens focusing is performed as said element moves within its focusing range toward said reference point. A unidirectional focus control system of this type is significantly less complex than a bidirectional focus control system because it is unnecessary to continuously monitor lens element movement as said element is moved toward said known reference point. The cost savings attendant a unidirectional focus control system over a bidirectional focus control system makes it attractive to the control system designer. An example of a unidirectional focus control system for a variable focus camera lens is described in U.S. Pat. No. 3,713,371 to KURIHARA et al.

In U.S. patent application Ser. No. (Case no. 5846) by SHENK, a variable focus lens is positionable to the proper subject-in-focus position by a focus control system having both manual and automatic focusing capabilities. The automatic focus control portion of said focus control system is of the unidirectional type and the proper operation of said unidirectional focus control system is dependent upon said lens being moved at least a minimum distance outside of its normal focusing range, and the actuation of a switch by such lens movement. A problem with this type of unidirectional focus control system is that it is possible to manually move the movable lens element far enough outside of its normal focusing range to actuate said switch without moving said lens said required minimum distance, which would cause the lens to be misfocused by the automatic focus control system if the automatic focus control mode is selected after the lens has been so positioned.

An important feature of the automatic focus control portion of the unidirectional focus control system disclosed in said SHENK application is its ability to always move said lens said minimum distance outside of its normal focusing range if said lens is within its normal focusing range when the automatic focus control mode is selected. If the automatic focus control system were the only means utilized to move said variable focus lens said minimum distance outside of its normal focusing range, the above-described misfocusing by said unidirectional focus control system would be avoided.

SUMMARY OF THE INVENTION

In a variable focus lens system having both manual and automatic focus control wherein said automatic focus control includes drive means that are selectively coupled to said lens, the proper operation of said automatic focus control system is dependent upon the movement of said lens at least a minimum distance outside of its normal focusing range, and the actuation of a switch by such lens movement. In this type of control system it is possible to manually move the lens far enough outside of its normal focusing range to actuate said switch without moving said lens said required minimum distance which would cause the lens to be misfocused by the automatic focus control system if the automatic focus control mode is selected after the lens has been so positioned. An important characteristic of this type of control system is that it always moves said variable focus lens to the proper position outside of its normal focusing range for subsequent automatic lens focusing when it is moved to said lens position by said automatic focus control drive means. The lens will always be driven to said proper position by said automatic focus control drive means if said lens is within its normal focusing range when the automatic focus control mode is selected. In accordance with a preferred embodiment of the present invention, spring force biasing means are provided for urging said lens into its normal focusing range whenever said lens is outside of said focusing range so that positioning of said lens to the proper position for subsequent automatic lens focusing will always be performed automatically by the automatic focus control system drive means when the automatic focus control mode is selected.

DESCRIPTION OF THE PREFERRED EMBODIMENTS

Figure 1:
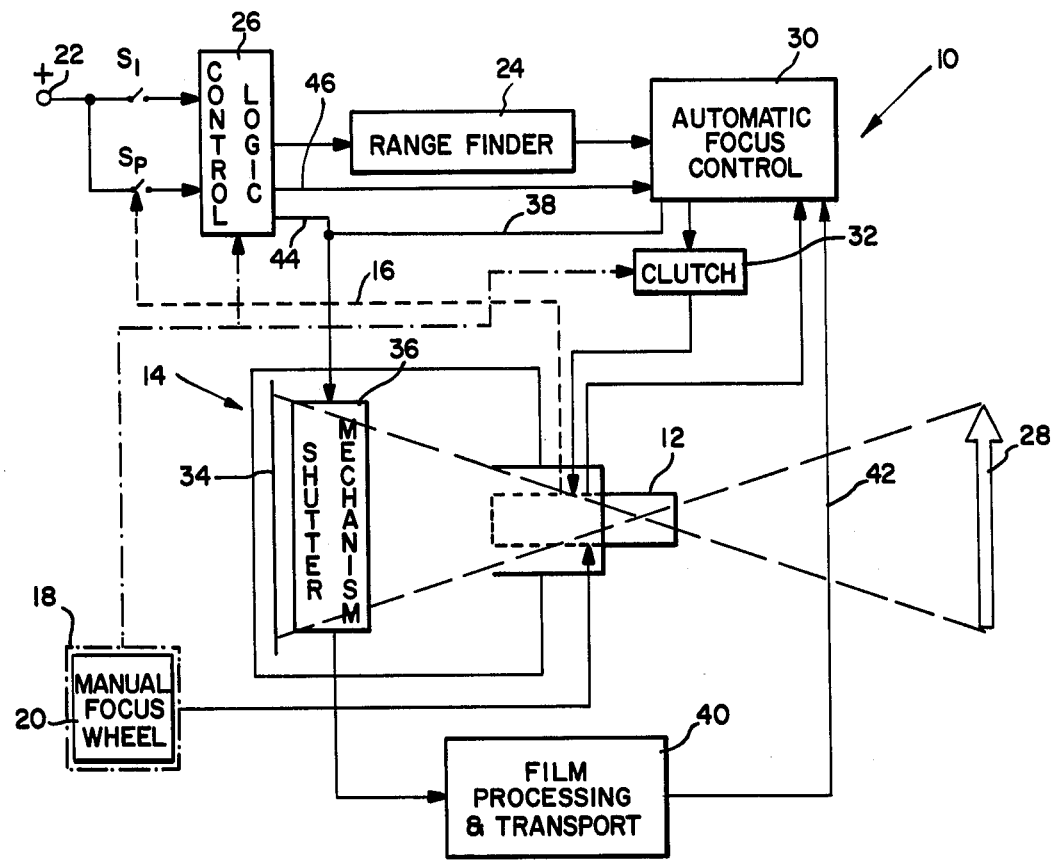
FIG. 1 is a schematic diagram of a manual and automatic focus control system for a variable focus lens that is constructed in accordance with the present invention.

Referring now to the drawings and, specifically, to FIG. 1, where a schematic diagram of manual and automatic focus control system 10 for variable focus lens 12 of self-processing camera 14, is depicted. The automatic focus control portion of control system 10 is described in some detail in the above-mentioned application by SHENK and, for convenience, the specification in said SHENK application is specifically incorporated herein. In order to automatically focus variable focus lens 12, switch $S_I$ must be actuated to its closed position. Automatic focusing will be initiated by the closure of switch $S_I$ if lens actuated switch $S_p$, which is coupled to variable focus lens 12 through mechanical linkage 16, has been actuated to its open position by lens 12 movement, and if displaceable barrier or shroud 18, which is described in some detail in the above-mentioned application by OSTROWSKI et al, is positioned such that it precludes manual access to manual focus wheel 20 and enables control logic 26. If switch $S_I$ is actuated to its closed position under these conditions, a source of power (not shown) which is connected to terminal 22 will, in turn, be connected to the input of rangefinder 24 through control logic 26 thereby activating said rangefinder 24. When so activated, rangefinder 24 acoustically determines the distance to a subject to be photographed such as subject 28. A more detailed explanation of how rangefinder 24 determines distance to a remote object is contained in the above-referenced SHENK application. When the distance to subject 28 has been determined, rangefinder 24 causes automatic focus control 30 to transmit a lens element positioning force to variable focus lens 12 through clutch 32 causing said lens 12 to form an in-focus image of subject 28 at film plane 34 of said camera 14 when shutter mechanism 36 has been actuated to its open position by a signal from automatic focus control 30 through path 38. As mentioned above, camera 14 is of the self-processing type and therefore once the actuation of shutter mechanism 36 is complete, film processing and transport cycle 40 is initiated. If switch $S_I$ has been manually actuated to its open position when film processing and transport cycle complete signal 42 is transmitted to automatic focus control 30, said automatic focus control 30 will cause the movable element of variable focus lens 12 to be driven to the point where lens movement actuated switch $S_p$ is actuated to its open position through said mechanical linkage 16.

To manually focus variable focus lens 12, shroud 18 is manually positioned to its displaced position so that manual focus wheel 20 can be actuated by a camera 14 operator. When shroud 18 is so displaced, said displacement configures control logic 26 such that rangefinder 24 is disabled, the output from switch $S_p$ is inhibited, and the variable focus lens 12 actuator in automatic focus control 30 is mechanically uncoupled from said variable focus lens 12. The details of how the actuator in automatic focus control 30 is uncoupled from variable focus lens 12 is described in much greater detail in the above-mentioned OSTROWSKI et al. application. When manual focusing is complete, shutter mechanism 36 may be actuated for picture taking purposes by actuating switch $S_I$ to its closed position which will cause a shutter actuating signal to be sent to shutter mechanism 36 through path 44. When shutter mechanism 36 has been fully actuated, film processing and transport cycle is then automatically initiated.

In order to return the focus control system to its automatic mode, shroud 18 is repositioned over manual focus wheel 20, said repositioning causing control logic 26 to enable rangefinder 24 and to remove the inhibit from the output of lens actuated switch $S_p$, and causing clutch 32 to couple the above-mentioned actuator in automatic focus control 30 to variable focus lens 12. If lens actuated switch $S_p$ was actuated to and left in its closed position by the manual movement of variable focus lens 12 by manual focus wheel 20, automatic focus control 30 will sense said switch $S_p$ closure through path 46 when said shroud 18 is repositioned over manual focus wheel 20, and will cause said variable focus lens 12 to be driven until switch $S_p$, which is mechanically coupled to variable focus lens 12 through linkage 16, is actuated to its open position by variable focus lens 12 movement. The operation of control system 10 is largely dependent upon the rotational and axial position of the movable element of variable focus lens 12. Therefore, at this point, it would be useful to refer to FIG. 2 in order to fully appreciate the full range of said lens 12 element movement and how said lens element movement relates to the operation of control system 10.

Figure 2:
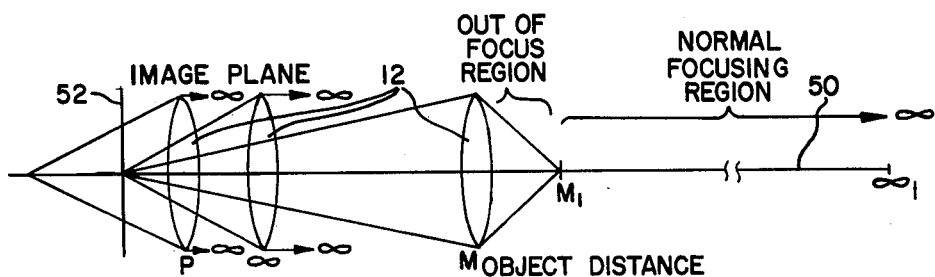
FIG. 2 is a schematic diagram showing the full range of movement of a variable focus lens controlled by the focus control system of the present invention.

In FIG. 2, variable focus lens 12 is, for convenience, artificially depicted as a single lens element that is movable along object distance axis 50 for focusing purposes and not as a multiple element lens having both fixed and movable elements as found in most variable focus lens cameras. Any object located between position $M_l$ and $\infty_l$ on object distance axis 50 is focusable by variable focus lens 12 at image plane 52. Objects located at position $M_l$ on object distance axis 50 will be focused at image plane 52 when variable focus lens 12 is positioned at position M. Therefore, the distance to an object located at $M_l$ represents the minimum focusing distance of said variable focus lens 12. Objects positioned at $\infty_l$ or beyond on object distance axis 50 will have an image focused at image plane 52 by variable focus lens 12 when said variable focus lens 12 is positioned at its oo position. Objects appearing to the left of position $M_l$ on object distance axis 50 cannot be sharply focused at image plane 52 by variable focus lens 12 and therefore objects appearing to the left of said position $M_l$ will be considered as being in the out-of-focus region of variable focus lens 12. Objects located on object distance axis 50 that are not nearer to lens 12 than position $M_l$ are within the normal focusing range of variable focus lens 12.

In addition to the movement of variable focus lens 12 within its normal focusing range, variable focus lens 12 is also movable outside of its normal focusing range between its oo position, and position P which represents the park position of variable focus lens 12 or the position at which switch $S_p$ (FIG. 1) is in its open position. In this, the preferred embodiment, the P or park position is located between image plane 52 and the oo position of variable focus lens 12. However, this particular location for the park position of variable focus lens 12 is merely a design choice and could very well have been located between the M position of variable focus lens 12 and minimum focus position $M_l$ on object distance axis 50.

Figure 3:
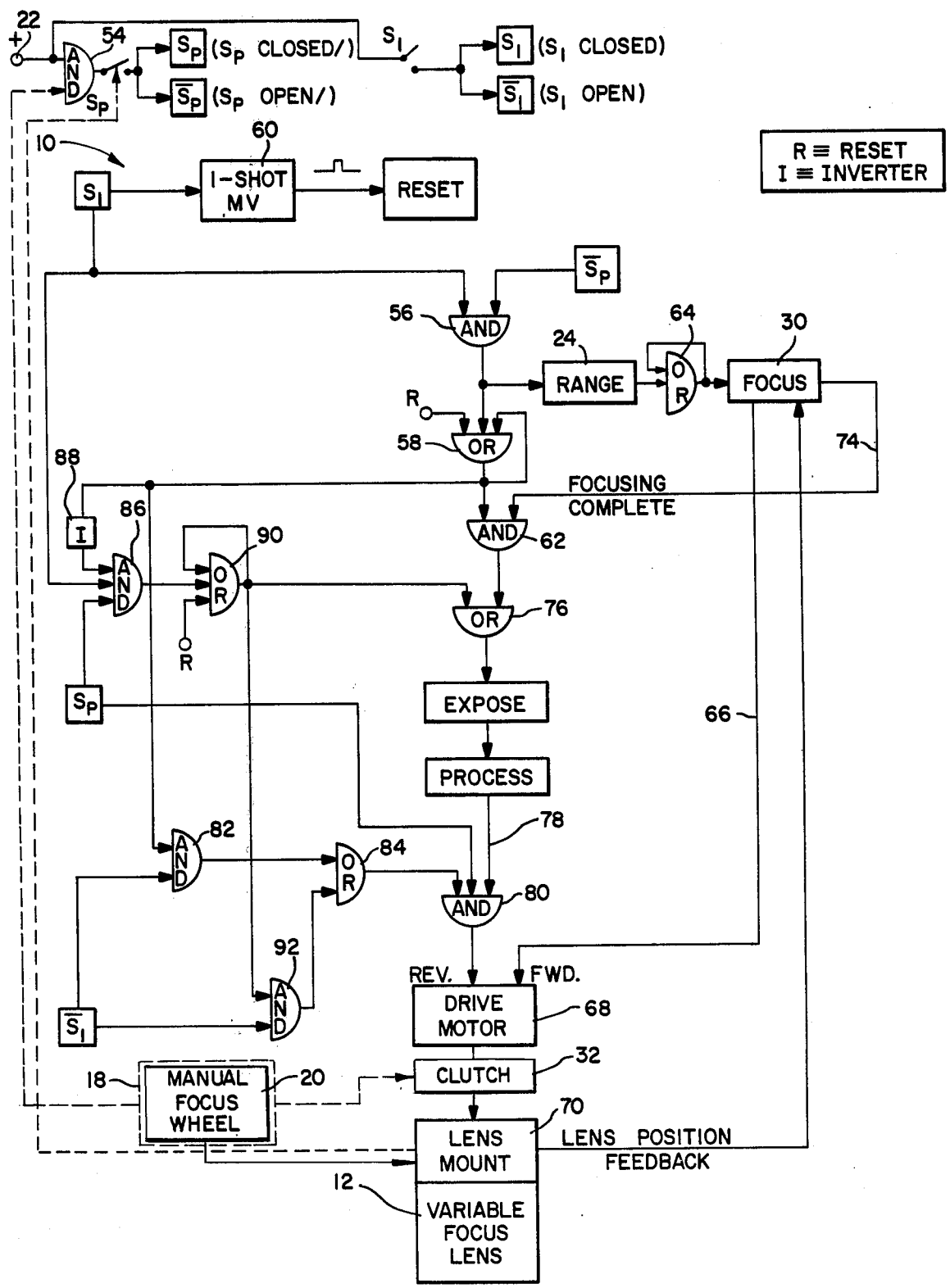
FIG. 3 is a schematic diagram of an automatic and manual focus control system for a variable focus lens that automatically returns said control system to its automatic mode whenever its manual mode is utilized.

In this, the preferred embodiment, control system 10 will automatically return variable focus lens 12 to the $S_p$ open or to the variable focus lens 12 park position if variable focus lens 12 is within its normal focusing range when the automatic focus control mode is selected, as previously mentioned. FIG. 3 shows how control system 10 and, more specifically, how control logic block 26 in FIG. 1 functions within said control system 10 to accomplish such lens positioning.

In FIG. 3, focus control system 10 utilizing variable focus lens 12 movement outside of its normal focusing range in accordance with a preferred embodiment of the present invention, is depicted. In control system 10, a source of electrical power (not shown) connected to terminal 22 is supplied to one terminal of manually actuated, spring force biased, single pole switch $S_l$, and to one terminal of lens movement actuated, single pole switch $S_p$ through AND gate 54. Either signal $S_l$ or signal $\overline{S}_l$ will appear at the output of switch $S_l$ when said switch $S_l$ is actuated. Signal $S_l$ will appear at the output of switch $S_l$ when switch $S_l$ is closed and signal $\overline{S}_l$ will appear at the output of switch $S_l$ when said switch $S_l$ is opened. Similarly, either signals $S_p$ or $\overline{S}_p$ will appear at the output of switch $S_p$ when said switch $S_p$ is actuated if gate 54 has been rendered conductive by said shroud 18 having been positioned over manual focus wheel 20 (FIG. 1) such that manual access to said focus wheel 20 is precluded. If AND gate 54 is conductive, signal $S_p$ will appear at the output of switch $S_p$ when switch $S_p$ is closed and signal $\overline{S}_p$ will appear at the output of switch $S_p$ when said switch $S_p$ is opened.

When switch $S_l$ is closed for picture taking purposes, thereby generating signal $S_l$ at its output, AND gate 56 is rendered conductive if lens movement actuated switch $S_p$ is open or if lens 12 is in its park position as previously discussed. If said switch $S_p$ is opened, signal $\overline{S}_p$ will appear at AND gate 56, rendering said AND gate 56 conductive when said signal $\overline{S}_p$ is combined with signal $S_l$. When AND gate 56 is rendered conductive, rangefinding means 24 is activated so that it can acoustically determine the distance to subject 28 (FIG. 1) as previously discussed. The output from AND gate 56 also renders latching OR gate 58 conductive. Latching OR gate 58 will remain conductive even if the input from AND gate 56 is removed, because once there is an output at a logic gate of this type, said output is fed back into the input of the same gate which causes said gate to be maintained in its conducting state. The output from gate 58 is removed only when said gate is reset by a pulse that is generated by one-shot multivibrator 60, said multi-vibrator generating said pulse when switch $S_l$ is actuated to its closed position. The output of latching OR gate 58 is sent to AND gate 62, said AND gate 62 being held non-conductive until focus control means 30 has caused the positioning of variable focus lens 12 to the correct subject-in-focus position. After the distance to a subject to be photographed has been determined by rangefinding means 24, a range complete signal is sent to latching OR gate 64 and the output of latching OR gate 64 is transmitted to focus control means 30 to initiate variable focus lens 12 focusing. Latching OR gate 64 maintains a focus initiate signal to focusing means 30 after focusing movement of said variable focus lens 12 has caused the actuation of switch $S_p$ to its closed position, the effect of which is to render AND gate 56 nonconductive and to deactivate rangefinding means 24 together with its focus initiating output to said focus control means 30.

Focus control means 30 functions in the same manner as the focus control means described in some detail in the above-mentioned SHENK application. Focus control means 30 sends drive forward signal 66 to drive motor 68 commanding said drive motor 68 to drive lens mount 70 through clutch 32 together with the movable element of variable focus lens 12 to the correct subject-in-focus position, said in-focus position to be sensed by lens position sensing means similar to that in the above-mentioned SHENK application. Once focusing is complete, focus complete signal 74 renders AND gate 62 conductive and the output from said AND gate 62 renders OR gate 76 conductive. The output from OR gate 76 actuates a shutter mechanism which exposes and subsequently initiates the processing of instant developing film such as that sold under the registered trademark SX-70 and commercially available from the Polaroid Corporation. In a camera where instant developing film is not utilized, the output from OR gate 76 would merely initiate or trigger a conventional, electrically actuated shutter mechanism. Once processing is complete or, in the case of a nonself-processing film camera, once the shutter mechanism has been fully actuated, shutter actuation or film processing complete signal 78 is sent to AND gate 80. If switch $S_l$ has been actuated to its open position by a camera operator, signal $\overline{S}_l$ will be generated at its output and AND gate 82 will be rendered conductive because latching OR gate 58 is still in its conductive state, and the output from said OR gate 58 is present at the input of said AND gate 82. AND gate 80 will be rendered conductive upon receipt of completion signal 78 because AND gate 82 has been rendered conductive by the actuation of switch $S_l$ to its open position and the output of said AND gate 82 is connected to the input of AND gate 80 through OR gate 84. Signal $S_p$ is already present at the input of said AND gate 80 because switch $S_p$ was actuated to its closed position when variable focus lens 12 was moved toward its normal focusing range. When AND gate 80 is rendered conductive, a reverse drive signal is sent to drive motor 68 which, in turn, causes said drive motor to drive lens mount 70, through clutch 32, toward its park position to the point where said switch $S_p$ has been actuated to its open position by said lens mount 70 movement. When switch $S_p$ is actuated to its open position, signal $S_p$ will disappear from its output and AND gate 80 will be rendered nonconductive, thereby shutting off the reverse drive signal to drive motor 68. At this point, variable focus lens 12 is in its park position or in the position at which switch $S_p$ is open.

Figure 4:
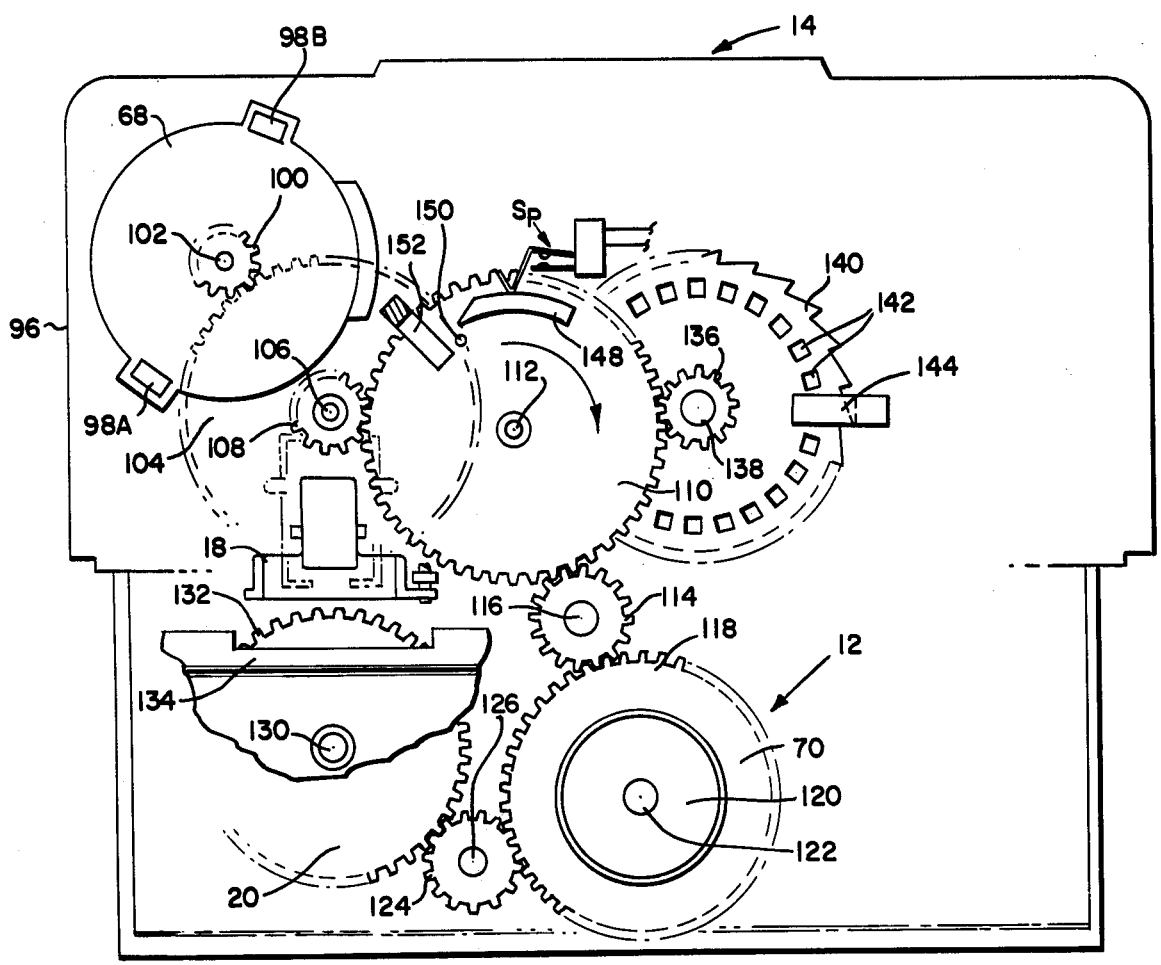
FIG. 4 is a front elevational view of a camera having automatic and manual focus control that does not incorporate the misfocus preventing arrangement of the present invention.

If switch $S_p$ had been in its closed rather than in its open position when switch $S_l$ was initially closed, AND gate 86 rather than AND gate 56 would have been rendered conductive. Switch $S_p$ would be in said closed position if variable focus lens 12 had been manually focused by a camera operator. When switches $S_l$ and $S_p$ are both closed, signals $S_l$ and $S_p$ appear at the input to said AND gate 86. There is an output from inverter 88 because there is no output from latching OR gate 58 due to the lack of an output from AND gate 56, which would satisfy said AND gate 86. An output from AND gate 86 renders latching OR gate 90 conductive, said OR gate 90 remaining in its conductive state until it is reset. An output from latching OR gate 90 renders OR gate 76 conductive which, in turn, initiates a film exposure and processing cycle in the case of a self-processing film camera or merely actuates a conventional, electrically actuated shutter mechanism in the case of a nonself-processing film camera. Upon completion of film exposure, or of film exposure and processing, whichever the case might be, shutter actuation or film processing complete signal 78 is sent to AND gate 80. If switch $S_l$ has been actuated to its open position by a camera operator, thereby generating signal $\overline{S}_l$ at its output, AND gate 92 will be rendered conductive because latching OR gate 90 is still in its conductive state and the output from OR gate 90 and said signal $\overline{S}_l$ is present at the input of said AND gate 92. AND gate 80 will be rendered conductive upon the receipt of completion signal 78 because AND gate 92 was rendered conductive by the actuation of switch $S_l$ to its open position and the output of said AND gate 92 is present at the input of AND gate 80 through OR gate 84. Signal $S_p$ is already present at the input of said AND gate 80 because switch $S_p$ was actuated to its closed position when variable focus lens 12 was moved toward its normal focusing range. When AND gate 80 is rendered conductive, a reverse drive signal is sent to drive motor 68 which, in turn, causes said drive motor to drive lens mount 70, through clutch 32, toward its park position to the point where switch $S_p$ is actuated to its open position by said lens mount 70 movement. When switch $S_p$ is eventually actuated to its open position signal $S_p$ will disappear from its output and AND gate 80 will be rendered nonconductive, thereby shutting off the reverse drive signal to drive motor 68. At this point, variable focus lens 12 is in its park position or in the position at which switch $S_p$ is open. Focus control means 30 cooperates with drive motor 68 for automatically focusing variable focus lens 12. Variable focus lens 12 can also be focused by the movement of manual focus wheel 20 as previously discussed. The mechanical details of how drive motor 68 and manual focus wheel 20 are coupled to variable focus lens 12 for focusing purposes and how lens actuated switch $S_p$ is actuated by lens 12 movement are depicted in FIG. 4. The details of how drive motor 68 and manual focus wheel 20 are coupled to variable focus lens 12 are also described in the above-mentioned OSTROWSKI et al. application.

Referring now to FIG. 4, drive motor 68, of circular cross section, is mounted in a fixed position with respect to camera 14 support structure 96 by clip-type flexible fingers 98A, 98B, said fingers having hooked ends which extend from said structure 96. Drive motor pinion gear 100 is mounted on drive motor shaft 102 and is in a fixed position with respect thereto. Main drive gear 104 is mounted for rotation on shaft 106, said shaft being in a fixed relation with respect to said camera 14 support structure 96. The teeth of gear 100 and the teeth of gear 104 are in a meshed relation such that rotation of one of said gears causes the rotation of the other. Main drive pinion gear 108 is mounted for rotation about shaft 106, said gear 108 being selectively maintained in a fixed position with respect to main drive gear 104 by clutch 32 (FIG. 1). Second idler gear 110 is mounted for rotation on shaft 112, said shaft 112 being in a fixed relation with respect to support structure 96. The teeth of second idler gear 110 and the teeth of main drive pinion gear 108 are in a meshed relation such that rotation of one of said gears causes the rotation of the other. First idler gear 114 is mounted for rotation on shaft 116, said shaft 116 being in a fixed relation with respect to support structure 96. Lens or ring gear 118 forms a portion of lens mount 70 of movable lens element 120 of variable focus lens 12, and is mounted for rotation with said movable lens element 120. Lens gear 118 is mounted for rotation about and for movement along principal image forming axis 122 of said variable focus lens 12, said axis being in a fixed relation with respect to support structure 96. The teeth of lens gear 118 are in a meshed relation with respect to the teeth of first idler gear 114. Therefore, rotation of first idler gear 114 will cause lens gear 118 rotation, and vice versa.

In addition to being in a meshed relation with respect to first idler gear 114, lens gear 118 is also in a meshed relation with respect to manual focus idler gear 124. Manual focus idler gear 124 is mounted for rotation on shaft 126, said shaft 126 being in a fixed relation with respect to support structure 96. Manual focus wheel 20 is mounted for rotation on shaft 130, said shaft 130 being in a fixed relation with respect to support structure 96. The teeth of manual focus wheel 20 are in a meshed relation with the teeth of manual focus idler gear 124. A portion of teeth 132 of manual focus wheel 20 extend beyond housing portion 134 of camera 14, for manual movement by a camera 14 operator.

Besides main drive pinion gear 108 and first idler gear 114, the teeth of second idler gear 110 are also in a meshed relation with respect to lens element 120 motion sensing pinion gear 136. Lens motion sensing pinion gear 136 is mounted for rotation on shaft 138. Encoder wheel 140 is also mounted for rotation on shaft 138 and is in a fixed relation with respect to said lens motion sensing pinion gear 136. Encoder wheel 140 contains a plurality of equally spaced openings 142 that cooperate with pick-off module 144 to cause said moduel 144 to generate a series of pulses representative of encoder wheel 140 position. Because of a known effective gear ratio between encoder wheel 140 and lens element 120, which is provided by gears 36, 110, 114 and 118, and a known linear relationship between lens element 120 rotational and axial movement, the pulses generated by said pick-off module 144 will be representative of the focal position of variable focus lens 12.

From the foregoing description it can be seen that drive motor 68 and manual focus wheel 20 are mechanically coupled to one another in a driving relationship in that rotation of drive motor pinion gear 100 by drive motor 68 will cause manual focus wheel 20 to rotate. Conversely, manual rotation of manual focus wheel 20 by a camera 14 operator will cause drive motor pinion gear 100 and shaft 102 of drive motor 68 to rotate. Because of this just described driving relationship between drive motor 68 and manual focus wheel 20, a displaceable barrier or shroud 18 is provided, said shroud impeding access to manual focus wheel 20 when lens element 120 is being driven by drive motor 68. When shroud 18 is displaced from manual focus wheel 20 to permit manual movement of said focus wheel 20 by a camera 14 operator, clutch 32 (FIG. 1) is actuated by said shroud displacement causing drive motor 68, and gears 100 and 104 to become uncoupled from lens element 120 of variable focus lens 12. The specific details of how this uncoupling actually occurs and how lens 12 moves axially when rotated by drive motor 68 or by focus wheel 20 is described in much greater detail in the above-mentioned OSTROWSKI et al. application.

The nature of focus control system 10 (FIG. 1) is such that when movable lens element 120 of variable focus lens 12 has been moved far enough outside of its focusing range, lens mount actuated switch $S_p$ is actuated to its open position by the engagement of cam portion 148 of second idler gear 110 projecting from the front face of said second idler gear 110. By opening switch $S_p$ control system 10 assumes that movable lens element 120 has reached its initial reference position for subsequent focusing by the automatic focus control portion of control system 10. One of the undesirable characteristics of focus control system 10 is the ability of a camera 14 operator to manually position the movable element of variable focus lens 12 such that said lens element 120 can be positioned far enough outside of its normal focusing range of variable focus lens 12 to actuate switch $S_p$ to its open position without having reached the initial reference position of variable focus lens 12 as determined by the physical position of specific openings 142 in encoder wheel 140 with respect to pick off module 144, and without pin 150 projecting from second idler gear 110 having engaged fixed mechanical stop 152 mounted on support structure 96. If those specific openings are on the wrong side of pick off module 144 when the automatic focusing of variable focus lens 12 is subsequently initiated, variable focus lens 12 will be misfocused by an amount that is related to the number of such encoder wheel openings 142 that are initially on the wrong side of said pick off module 144. Another characteristic of the automatic focus control portion of control system 10 is that when commanded to do so, it always drives movable lens element 120 far enough outside of its normal focusing range to open lens actuated switch $S_p$ and to properly position openings 142 in encoder wheel 140 such that they are in the correct physical position with respect to pick off module 144 when variable focus lens 12 is subsequently focused by the automatic focus control portion of said control system 10.

One way to avoid the just described misfocusing problem when the automatic focus control portion of control system 10 is selected, is to always use the automatic focus control system to position movable lens element 120 of variable focus lens 12 to its initial or reference position outside of its normal focusing range for subsequent automatic lens focusing. One way to insure that variable focus lens 12 is always automatically positioned to its initial or reference position is to provide a spring force biasing means that will urge said lens 12 into its normal focusing range whenever it is moved outside of said normal focusing range so that lens movement actuated switch $S_p$ will be forced into its closed position. When lens movement actuated switch $S_p$ is closed and the automatic focus control portion of control system 10 is thereby enabled, said automatic focus control will drive variable focus lens 12 to its initial or reference position when the automatic focus control mode is subsequently selected. It should be noted that even though switch $S_p$ is actuated to its open position before lens 12 has reached said initial or reference position, which removes power from drive motor 68, there are enough inertial forces in rotating drive motor 68 and its associated gear train to correctly position said variable focus lens 12.

Figures 4A, 4B:
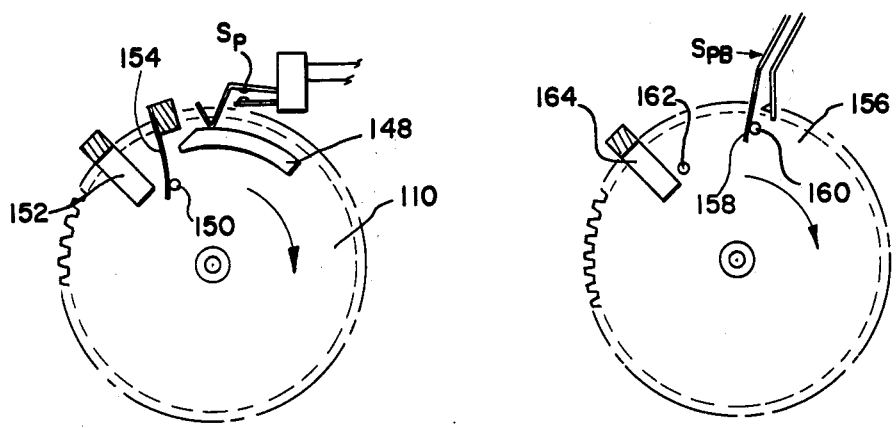
FIG. 4A is a detail of the second idler gear depicted in FIG. 4 incorporating the misfocus preventing inventive concept of the present invention.
FIG. 4B is an alternative embodiment of the misfocus preventing inventive concept depicted in FIG. 4A.

One possible arrangement for a spring force biasing means to urge variable focus lens 12 into its normal focusing range to insure that switch $S_p$ is in its closed position for the proper automatic positioning of variable focus lens 12 to its initial or reference position, is depicted in FIG. 4A. In FIG. 4A, the same second idler gear depicted in FIG. 4 is also depicted in said FIG. 4A. As said second idler gear 110 rotates in a counterclockwise direction, cam portion 148 projecting from the front face of said second idler gear 110 engages lens actuated switch $S_p$ and actuates said switch $S_p$ to its open position. At the point where variable focus lens 12 leaves its normal focusing range and enters the region that is immediately outside of said normal focusing range, pin 150 engages spring 154 which places a clockwise biasing force on second idler gear 110 and on variable focus lens 12 which is coupled to said idler gear through a gear train. This clockwise biasing force will remain on second idler gear 110 and variable focus lens 12 so long as said lens 12 remains outside of its normal focusing range. Maximum counterclockwise rotation of second idler gear 110 is limited by the engagement of pin 150 and spring 154 with fixed stop 152 as previously described above with reference to FIG. 4.

Another possible arrangement for a spring force biasing means to urge variable focus lens 12 into its normal focusing range to insure that switch $S_p$ is in its closed position for the proper automatic positioning of variable focus lens 12 to its said initial position, is depicted in FIG. 4B. In FIG. 4B, second idler gear 156, which is an alternate arrangement for second idler gear 110 depicted in FIGS. 4 and 4A and lens movement actuated switch $S_{pB}$, which is an alternate form of lens movement actuated switch $S_p$ in said FIGS. 4A and 4B, are depicted. Switch $S_{pB}$ has an extending arm 158 that contacts pin 160 projecting from a front face of said gear 156 when said gear 156 rotates in a counterclockwise direction and reaches the point where variable focus lens 12 leaves its normal focusing range and enters the region that is immediately outside of its said normal focusing range, thereby actuating said switch $S_{pB}$ to its open position. Switch $S_{pB}$ places a clockwise force on said second idler gear 156 and lens 12 to which it is coupled, said clockwise force remaining on said gear and said lens so long as said lens remains outside of its normal focusing range. Maximum counterclockwise rotation of second idler gear 156 is limited by the engagement of pin 162, projecting from the front face of said idler gear 156, with fixed mechanical stop 164.

DISCUSSION

When the automatic focus control mode is selected by positioning protective shroud 18 adjacent manual focus wheel 20, drive motor 68 is coupled to variable focus lens 12 through a gear train as previously discussed. When so coupled, drive motor 68 and its associated gear train place enough of a frictional and inertial load on variable focus lens 12 to prevent said lens 12 from being moved into its normal focusing range by spring force biasing means 154 (FIG. 4A) or by the spring force biasing means that forms a portion of switch $S_{pB}$ (FIG. 4B). This difference in loading on variable focus lens 12 between the coupled and uncoupled states of drive motor 68 is essential for the proper operation of the misfocus preventing inventive concept of the present invention. Without this loading difference, variable focus lens 12 would oscillate into and out of its normal focusing range when the automatic focus control mode was selected. This is so because when lens 12 is within its normal focusing range and the automatic focus control mode is selected, lens 12 will be driven outside of its normal focusing range because of switch $S_p$ or $S_{pB}$ being in its closed state. When lens 12 is driven outside of its normal focusing range by drive motor 68 said drive motor 68 will continue to drive lens 12 until switch $S_p$ or $S_{pB}$ is actuated to its open state. If drive motor 68 and its associated gear train did not provide the frictional and inertial load mentioned above, spring 154 (FIG. 4A) or the spring associated with switch $S_{pB}$ (FIG. 4B), would force lens 12 back into its normal focusing range causing said lens 12 to actuate switch $S_p$ or $S_{pB}$ to its closed state. Once said lens movement actuated switch $S_p$ or $S_{pB}$ is actuated to its closed state, the automatic focus control system would again command drive motor 68 to drive variable focus lens 12 outside of its normal focusing range and this oscillating movement of variable focus lens 12 would continue so long as the automatic focus control mode was selected if the above-mentioned two levels of loading were not provided by drive motor 68 and its associated gear train.

AND gates, OR gates, latching OR gates and inverters are the basic functional blocks that are utilized in the functionally represented control system depicted herein. An AND gate block will have an output so long as all of its inputs are present. An OR gate block will have an output so long as any of its inputs are present. A latching OR gate block continues to have an output once any input is present, even when all such inputs are removed. The output from a latching OR gate can only be removed by resetting said latching OR gate, after all inputs have been removed, in a manner such as that described above. An inverter will have an output whenever it has no input and will have no output whenever it does have an input.

The term normal focusing range as used herein means that focusing range that is actually being utilized by the variable focus lens, and said normal focusing range may be equal to or less than the complete focusing range of said variable focusing lens.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. A camera having an image plane and comprising:
   means for selectively coupling said camera to a source of electrical energy;
   a manually focusable lens mounted for displacement over a given operational range wherein it alternately serves to focus images of subjects positioned in various locations within a normal range of selectable subject distances at said image plane, and also for displacement outside of its said given operational range into another range wherein it does not serve to focus images of subjects positioned within said normal selectable subject distance range at said image plane, said lens being normally located at a reference position within its said other range when said camera is inoperative;
   means for producing a signal indicative of the position of a particular subject, within said normal selectable subject distance range, selected to be photographed;
   drive means for effecting the movement of said lens, responsive to said signal, from its said reference position within its said other range into its position within its said operational range wherein it serves to focus an image of the particular subject at said image plane to facilitate the recording of an image of the particular subject on film located at said image plane, and for subsequently automatically returning said lens to its said reference position within its said other range subsequent to its serving to focus an image of the particular subject at said image plane, said drive means including a switch arrangement, having a normal first state and a second state, and means for changing said switch from its said normal first state to its said second state responsive to said lens moving from its said reference position past a given point within its said other range intermediate its said reference position and its said operational range and for returning said switch arrangement from its said second state to its said normal first state responsive to said lens moving past said given point as it returns from its said operational range towards its said reference position, said drive means being arranged so as to be operative to effect said automatic return of said lens to its said reference position when said switch arrangement is in its said second state and inoperative to effect said automatic return when said switch arrangement is in its said normal first state;
   a manually accessible actuator mounted for displacement between a normal first position and a second position; and
   control means, responsive to the displacement of said actuator from its said normal first position into its said second position, for rendering said drive means ineffective for purposes of effecting the movement of said lens to a focus position within its said operational range thereby facilitating manual focus operations of said lens and the subsequent recording of manually focused images on film located at said image plane, said drive means being rendered effective upon the return of said actuator to its said normal first position with said switch arrangement being in its said second state to return said lens to its said reference position, said control means additionally including means operative when said actuator is disposed in its said second position, for urging the movement of said lens as necessary to locate said lens at a position wherein it has caused said switch to assume its said second state and wherein it is not disposed on the opposite side of the beginning of its said operational range from its said other range whereby said lens cannot be manually located at a position intermediate its said reference position and its said given position so as to remain there when manually released by the camera operator thus assuring that said lens is always located at its said reference position at the commencement of any automatic focusing operation.

2. The camera of claim 1 wherein said signal producing means is a ranging device whose operation is automatic responsive to being electrically energized and wherein said coupling means serves to energize both said ranging device and said drive means with power from the source of electrical energy.

3. The camera of claim 1 wherein said drive means includes an encoder device having a counting arrangement with a particular count correlated to said reference position of said lens and other counts correlated to both said reference position of said lens and different positions of said lens within its said operational range, said encoder device arranged to produce a plurality of counts as said lens moves from its said reference position to its said given position.

4. The camera of claim 1 wherein said drive means includes a motor normally drivingly engaged with said lens, and said control means includes means for disengaging said motor from said lens responsive to the displacement of said actuator from its said normal first position into its said second position, said control means being arranged so that its said urging means is operative to effect movement of said lens only when said motor, with its inherent inertia, is disengaged from said lens.

5. The camera of claim 1 wherein said drive means includes a motor normally drivingly engaged with said lens, said switch includes a resilient arm, a first electrical contact on said resilient arm and a second electrical contact operably disposed with respect to said first electrical contact, said control means includes means for disengaging said motor from said lens responsive to the displacement of said actuator from its said normal first position into its said second position and said urging means includes a pin operably coupled to said lens and arranged to contact said resilient arm of said switch to move its said first electrical contact out of engagement with its said second electrical contact as said lens moves past its said given position in returning from its said operational range towards its said reference position, whereby said pin, under the influence of said switch resilient arm and with said motor disengaged from said lens, urges the movement of said lens as necessary past its said given position towards its said operational range to assure that said lens is always located at its said reference position at the commencement of any automatic focusing operation, the inertia of said motor being such as to prevent said pin from effecting movement of said lens from its said reference position to its said given position when said motor is drivingly engaged to said lens.

6. In an auto-manual focusing camera having a variable lens mounted for displacement from a given reference position to selected positions within an operative range of the lens at which subjects at selected distances are focused at the camera image plane, automatic means responsive to a given signal for determining subject range, and for displacing said lens to a position corresponding to said subject range to facilitate film exposure, and for subsequently returning said lens to its said reference position, said automatic means including a switch operative from a first to a second state responsive to displacement of said lens to within its said operative range, a manually accessible actuator displaceable between an auto-control and a manual-control position, and means responsive to displacement of said actuator to its said manual-control position for rendering said automatic means inoperative whereby said lens may be manually positioned by the camera operator and upon return of said actuator to its said auto-control position for automatically rendering said automatic means operative to return said lens to its said reference position when said switch is in its said second state, the improvement comprising:

means responsive to said actuator being in its said manual-control position for precluding said lens from remaining at a location wherein said switch is in its said first state so that said operator cannot manually leave said lens at a position wherein said switch is in its first state but said lens is not at said reference position whereby said lens is always driven back to said reference position by said automatic means when said actuator is returned to its said auto-control position.

7. A camera comprising:
a film plane;
a first switch manually actuatable between an initial state and a second state for selectively coupling said camera to a source of energy;
a variable focus lens, said lens being movable between a first region where it can focus an image of an object at said film plane for picture taking purposes and a second region where said image cannot be so focused at said film plane without repositioning said camera;
an actuator, operatively coupled to said variable focus lens, for manually moving said lens within said first and second lens movement regions;
a second switch, actuatable between an initial state and a second state in response to the movement of said lens as said lens moves in said second region;
means for deriving a signal representative of the actual distance between said camera and a subject remote therefrom, said distance determining means being rendered operative by the actuation of said first switch to its said second state if said second switch is in its said initial state;
means for deriving a signal representative of lens movement at least a minimum distance within said second region and lens movement within said first region to where an image of said remote subject is in focus at said film plane;
drive means selectively coupled to said variable focus lens for moving said lens from said second region to a subject-in-focus position within said first region in response to said distance signal and to said lens movement signal, and for moving said lens at least said minimum distance into said second region from said first region when said first switch is in its said initial state and said second switch is in its said second state; and
spring force biasing means for urging said lens into said first region whenever said lens is positioned within said second region to insure that said second switch is in its said second state when movement of said variable focus lens is not precluded by either said actuator or said drive means.

8. A camera as defined in claim 7 wherein said spring force biasing means is a resilient arm that forms a portion of said second switch and wherein said arm resiliently engages said driving means when said lens is moved into its said second region, said drive means actuating said second switch to its initial state as said lens moves in its said second region, the force provided by said resilient arm urging said lens into its said first region.

9. A camera as defined in claim 8, wherein said drive means includes a gear train having a gear with a projection extending therefrom, and wherein said projection engages said resilient arm as said variable focus lens moves in its said second region thereby actuating said second switch to its said initial state.

10. A camera as defined in claim 7, wherein said spring force biasing means is an elongated resilient member having one end mounted in a fixed position on said camera and having its other end positioned such that it resiliently engages said drive means as said variable focus lens is moved in its said second region, the force provided by said elongated resilient member urging said lens into its said first region.

11. A camera as defined in claim 10, wherein said drive means includes a gear train having a gear with a projection extending therefrom, and wherein said projection engages said elongated resilient member as said variable focus lens moves in its said second region.

12. A camera comprising:

a film plane;

a first switch manually actuatable between an initial state and a second state for selectively coupling said camera to a source of energy;

a variable focus lens, said lens being movable between a first region where it can focus an image of an object at said film plane for picture taking purposes and a second region where said image cannot be so focused at said film plane without repositioning said camera;

an actuator, operatively coupled to said variable focus lens, for manually moving said lens within said first and second lens movement regions;

a second switch, actuatable between an initial state and a second state in response to the movement of said lens as said lens moves in said second region;

means for deriving a signal representative of the actual distance between said camera and a subject remote therefrom, said distance determining means being rendered operative by the actuation of said first switch to its said second state if said second switch is in its said initial state;

means for deriving a signal representative of lens movement at least a minimum distance within said second region and lens movement within said first region to where an image of said remote subject is in focus at said film plane;

drive means selectively coupled to said variable focus lens for moving said lens from said second region to a subject-in-focus position within said first region in response to said distance signal and to said lens movement signal, and for moving said lens at least said minimum distance into said second region from said first region when said first switch is in its said initial state and said second switch is in its said second state, said drive means providing substantially less opposition to variable focus lens movement when uncoupled from said variable focus lens; and spring force biasing means for urging said lens into said first region whenever said lens is positioned within said second region to insure that said second switch is in its said second state when said drive means is uncoupled from said variable focus lens.

13. A camera as defined in claim 12, wherein said spring force biasing means is a resilient arm that forms a portion of said second switch and wherein said arm resiliently engages said driving means when said lens is moved into its said second region, said drive means actuating said second switch to its initial state as said lens moves in its said second region, the force provided by said resilient arm urging said lens into its said first region.

14. A camera as defined in claim 13, wherein said drive means includes a gear train having a gear with a projection extending therefrom, and wherein said projection engages said resilient arm as said variable focus lens moves in its said second region thereby actuating said second switch to its said initial state.

15. A camera as defined in claim 12, wherein said spring force biasing means is an elongated resilient member having one end mounted in a fixed position on said camera and having its other end positioned such that it resiliently engages said drive means as said variable focus lens is moved in its said second region, the force provided by said elongated resilient member urging said lens into its said first region.

16. A camera as defined in claim 15, wherein said drive means includes a gear train having a gear with a projection extending therefrom, and wherein said projection engages said elongated resilient member as said variable focus lens moves in its said second region.

* * * * *